(12) United States Patent
Matsuo et al.

(10) Patent No.: US 10,971,906 B2
(45) Date of Patent: Apr. 6, 2021

(54) CABLE INSTALLATION METHOD AND COUPLING UNIT

(71) Applicant: HIEN ELECTRIC INDUSTRIES, LTD., Osaka (JP)

(72) Inventors: Kazuhisa Matsuo, Osaka (JP); Kazuyoshi Chikiri, Fukuchiyama (JP)

(73) Assignee: HIEN ELECTRIC INDUSTRIES, LTD., Osaka (JP)

( * ) Notice: Subject to any disclaimer, the term of this patent is extended or adjusted under 35 U.S.C. 154(b) by 261 days.

(21) Appl. No.: 16/030,210

(22) Filed: Jul. 9, 2018

(65) Prior Publication Data

US 2020/0014180 A1    Jan. 9, 2020

(51) Int. Cl.
  *H02G 1/04* (2006.01)
(52) U.S. Cl.
  CPC ...................... *H02G 1/04* (2013.01)
(58) Field of Classification Search
  CPC ............... H02G 1/04; H02G 7/10; H02G 1/06
  See application file for complete search history.

(56) References Cited

U.S. PATENT DOCUMENTS

| | | | | |
|---|---|---|---|---|
| 5,727,777 A * | 3/1998 | Chikiri | ...................... | H02G 1/04 254/134.3 R |
| 6,227,522 B1 * | 5/2001 | Chikiri | ...................... | H02G 7/10 254/134.3 R |
| 6,595,492 B2 * | 7/2003 | Penna | ...................... | H02G 1/04 254/134.3 R |
| 7,644,905 B2 * | 1/2010 | Ogata | ...................... | H02G 7/06 254/134.3 CL |
| 2020/0014180 A1 * | 1/2020 | Matsuo | ..................... | H02G 1/04 |

FOREIGN PATENT DOCUMENTS

| | | |
|---|---|---|
| JP | 93-70117 A | 3/1997 |
| JP | 2000-201411 A | 7/2000 |
| JP | 2004-015888 A | 1/2004 |
| JP | 2015-77049 A | 4/2015 |

OTHER PUBLICATIONS

International Search Report and Written Opinion dated Sep. 24, 2019, issued in counterpart Application No. PCT/JP2019/027218. (11 pages).

* cited by examiner

*Primary Examiner* — Minh N Trinh
(74) *Attorney, Agent, or Firm* — Westerman, Hattori, Daniels & Adrian, LLP

(57) ABSTRACT

The present invention provides a cable installation method and a coupling unit, the cable installation method enabling the installation of a cable with an improved workability. From a messenger wire 11 installed between poles 10a and 10b, a spiral hangar unit 121 or the like is suspended in the vicinity of first pole 10a, the leading end of the spiral hangar unit 121 and the leading end of the lead wire 13 is connected to each other with a coupling unit 14 interposed therebetween an operation of connecting another spiral hangar unit 122 to a tail end of the spiral hangar unit 121 while feeding the lead wire 13, is repeated, the spiral hangar unit 121 is fed to the vicinity of second pole 10b, then the spiral hangar 12 is fixed to the messenger wire 11, and thereafter a cable 16 is installed between the poles.

12 Claims, 7 Drawing Sheets

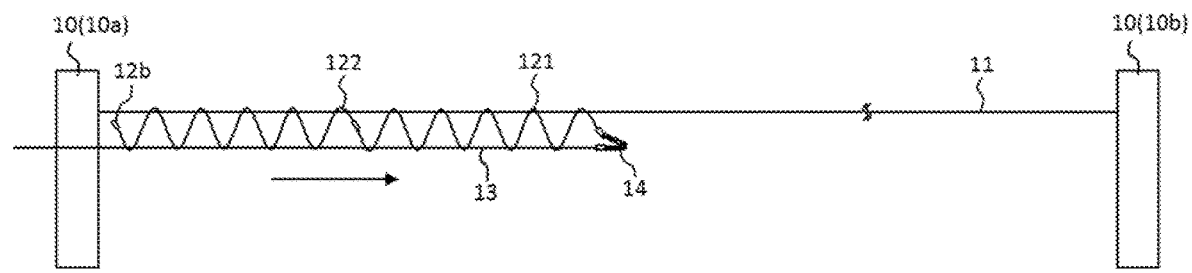
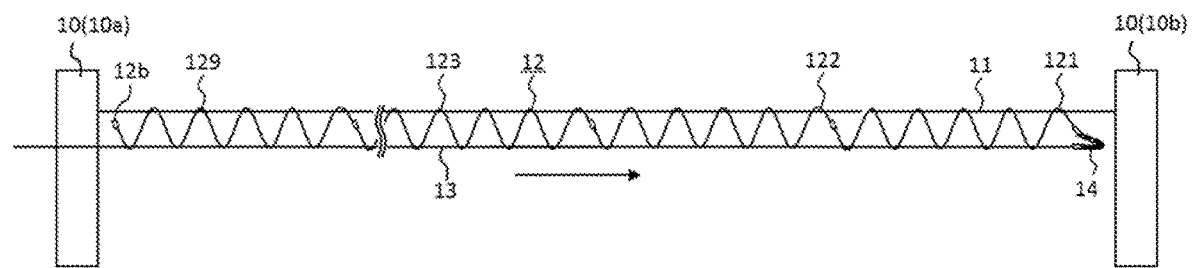
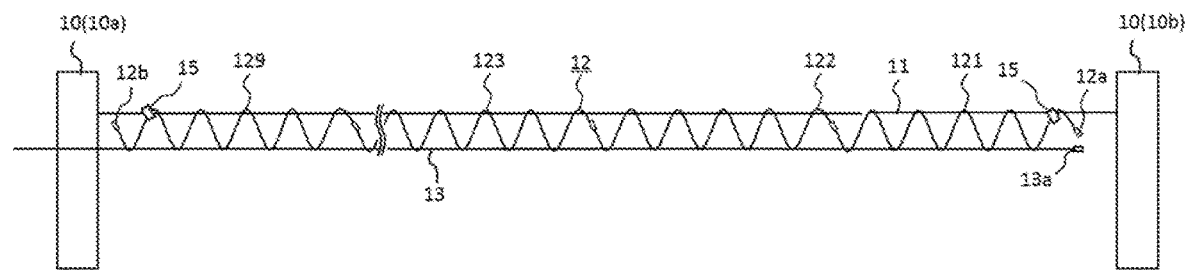

CABLE INSTALLATION METHOD AND COUPLING UNIT

TECHNICAL FIELD

The present invention relates to a cable installation method and a coupling unit.

BACKGROUND ART

A known method for installing a cable between poles includes suspending a spiral hangar from a messenger wire installed between the poles and inserting a cable in an internal space of the spiral hangar.

For example, the present inventors disclose in Patent Document 1 (JPH09-70117) a method for installing a cable by connecting a leading end of a spiral hangar and a leading end of a lead wire to a leading pulley, and then moving the leading pulley along a messenger wire.

Patent Document 2 (JP2000-201411) discloses a method for installing a spiral hangar by attaching a lead wire with a weight to a leading end of the spiral hangar suspended from a messenger wire installed between poles, and feeding the lead wire forward successively.

LIST OF PRIOR ART DOCUMENTS

Patent Document

[Patent Document 1] JPH09-70117
[Patent Document 2] JP2000-201411

SUMMARY OF INVENTION

Technical Problem

In the method disclosed in Patent Document 1, which is based on the leading pulley, the spiral hangar itself is pushed so is to be delivered from one end to the other end. Accordingly, the leading pulley's own weight and the spiral hangar's own weight increase as the spiral hangar is delivered, which causes difficult delivering and thus degraded workability. This problem may arise in a normal installation in which the distance between poles is not more than 50 m, and becomes prominent in a case of a long distance installation over 50 m. In addition, when the leading pulley is used, the pulley may fall out of the messenger wire while the lead wire is fed. In that case, additional work of putting the pulley again is required where the pulley fell out, which increases a work time.

Patent Document 2 discloses the method for attaching the lead wire with the weight but does not clarify how the lead wire is attached. In addition, the weight increases the friction between the messenger wire and the spiral hangar, which causes difficult feeding of the lead wire and thus degraded workability. This problem becomes prominent particularly when the distance between poles is longer.

An objective of the present invention is to provide a cable installation method and a coupling unit that make it easy to attach and detach the spiral hangar to and from a lead wire, to feed the lead wire, and to attach and detach a cable to and from the lead wire, and offer an improved workability.

Solution to Problem

To achieve the objective described above, the present inventors conducted intensive studies and made the present invention. The present invention has a gist of the following invention.

[1] A cable installation method in which a lead wire provided with a connector at a leading end of the lead wire is used to suspend a spiral hanger from a messenger wire installed between poles, the spiral hanger made up of a plurality of spiral hangar units connected to each other, each of the spiral hangar units including a leading end connector and a tail end connector, and a cable is inserted in an internal space of the spiral hangar, the cable installation method including following steps (1) to (5):

(1) a step of suspending a first spiral hangar unit, which is located at a leading endmost position of the plurality of spiral hangar units, from the messenger wire fir a vicinity of a first pole, in a state in which the lead wire is inserted in the internal space of the first spiral hangar unit and a leading end connector of the first spiral hangar unit is connected to a connector of the lead wire with a coupling unit interposed therebetween:

(2) a step of feeding the leading wire toward a second pole, in a state in which a tail end connector of the first spiral hangar unit is connected to a leading end connector of second spiral hangar unit in which the lead wire is inserted;

(3) a step of repeatedly connecting a tail end connector of the second spiral hangar unit to a leading end connector of other spiral hangar unit in which the lead wire is inserted and feeding the lead wire toward the second pole, until the leading end connector of the first spiral hangar unit reaches a vicinity of the second pole;

(4) a step of detaching the coupling unit from the leading end connector of the first spiral hangar unit and the connector of the lead wire; and (5) a step of fixing a leading end portion of the first spiral hangar unit to the messenger wire, and fixing a tail end portion of a spiral hangar unit, which is located at a tail endmost position of the plurality of spiral hangar units, to the messenger wire.

[2] The cable installation method according to the above [1], wherein the coupling unit includes a rod-shaped body including:

a lint connector at one end of the rod-shaped body and
a second connector at another end of the rod-shaped body,
the first connector being to be connected to the leading end connector of the spiral hangar unit, the second connector being to be connected to the connector of the lead wire.

[3] The cable installation method according to the above [1] or [2], further including following steps (a1) to (a3) after the steps (1) to (5):

(a1) a step of attaching the leading end connector of the lead wire to a leading end of the cable:

(a2) a step of drawing the lead wire until the leading end connector of the lead wire reaches the vicinity of the first pole; and (a3) a step of detaching the leading end connector of the lead wire from the leading end of the cable.

[4] The cable installation method according to the above [1] or [2], thither including following steps (b1) to (b5), after the steps (1) to (5):

(b1) a step of attaching the leading end connector of the lead wire to a leading end connector of a tow rope;

(b2) a step of drawing the lead wire until the leading end connector of the lead wire reaches the vicinity of the first pole; and (b3) a step of attaching the leading end connector of the tow rope to a leading end of the cable;

(b4) a step of drawing the tow rope until the leading end connector of the tow rope reaches the vicinity of the second pole; and (b5) a step of detaching the leading end connector of the tow rope from the leading end of the cable;

[5] The cable installation method according to any one of the above [1] to [4], wherein the cable includes, at the leading end of the cable, a connector to be connected to the connector of the lead wire.

[6] A coupling unit used in the cable installation method according to any one of the above [1] to [5], wherein the coupling unit includes a rod-shaped body including:
a first connector at one end of the rod-shaped body and
a second connector at another end of the rod-shaped body,
the first connector being to be connected to the leading end connector of the spiral hangar unit, the second connector being to be connected to the connector of the lead wire.

[7] The coupling unit according to the above [6], wherein the rod-shaped body includes a first straight section extending in a helix angle of the spiral hangar unit, a second straight section extending in a direction of movement of the spiral hangar unit, and a bending portion connected to the first straight section and the second straight section.

Advantageous Effects of Invention

The present invention makes it easy to attach and detach the spiral hangar to and from a lead wire and to feed the lead wire and the spiral hangar, and enables the installation of a cable with an improved workability. The present invention is useful particularly for the installation of a cable between poles at a distance.

BRIEF DESCRIPTION OF DRAWINGS

FIG. 5 is a schematic diagram illustrating a step (2) of the cable installation method according to the present embodiment.

FIG. 6 is a schematic diagram illustrating a step (3) of the cable installation method according to the present embodiment.

FIG. 7 is a schematic diagram illustrating a step (4) and a step (5) of the cable installation method according to the present embodiment.

DESCRIPTION OF EMBODIMENTS

A cable installation method and a coupling unit according to the present embodiment will be described below with reference to the drawings.

Figure 1:
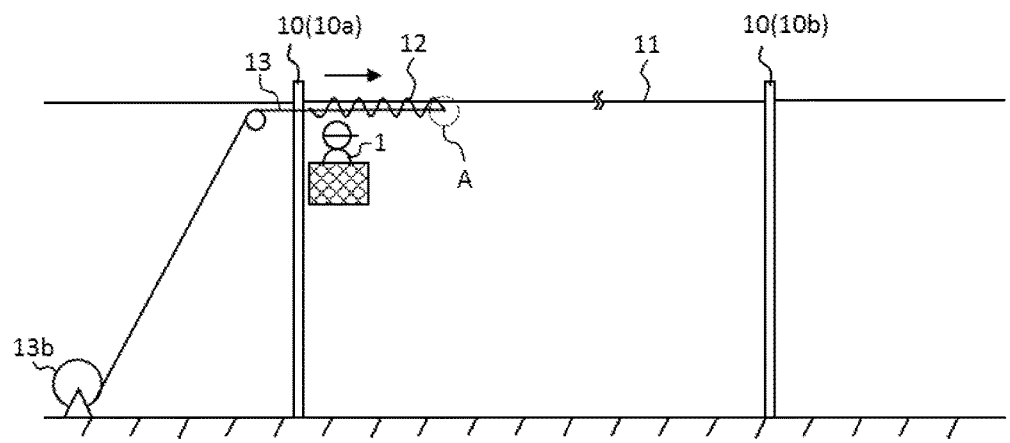
FIG. 1 is, a schematic diagram illustrating a cable installation method according to the present embodiment.
Figure 2:
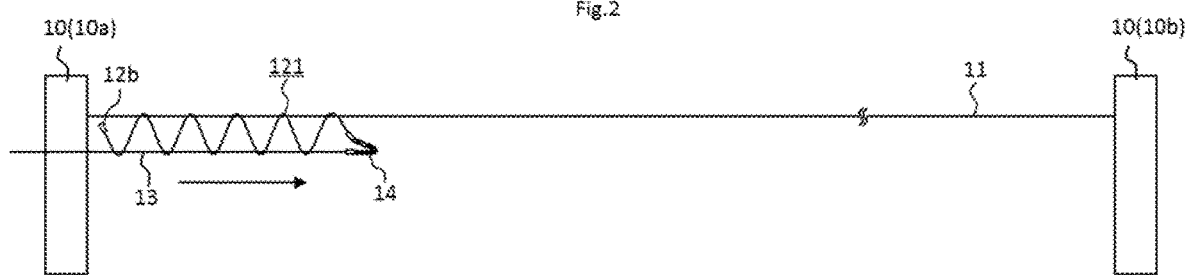
FIG. 2 is a schematic diagram illustrating a step (1) of the cable installation method according to the present embodiment.
Figure 3:
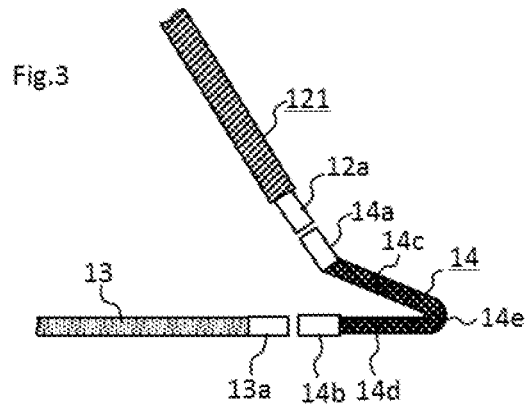
FIG. 3 is a diagram illustrating a coupling unit before connection.
Figure 4:
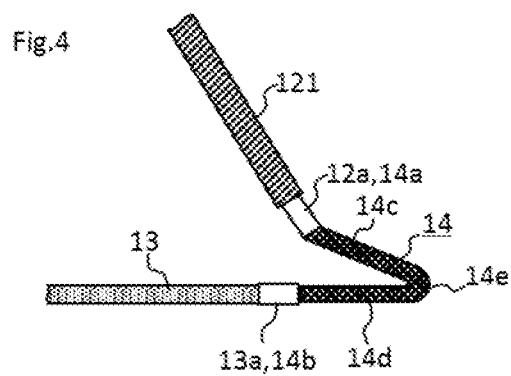
FIG. 4 is a diagram illustrating a coupling pint after the connection.
Figure 8:
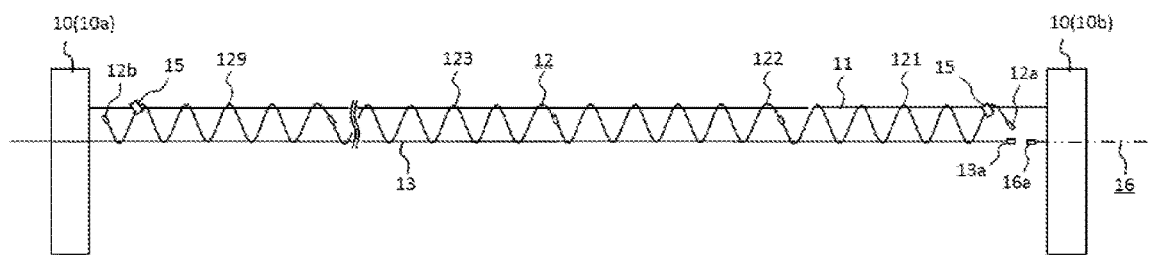
FIG. 8 is a schematic diagram illustrating a step (a1) of the cable installation method according to the present embodiment.
Figure 9:
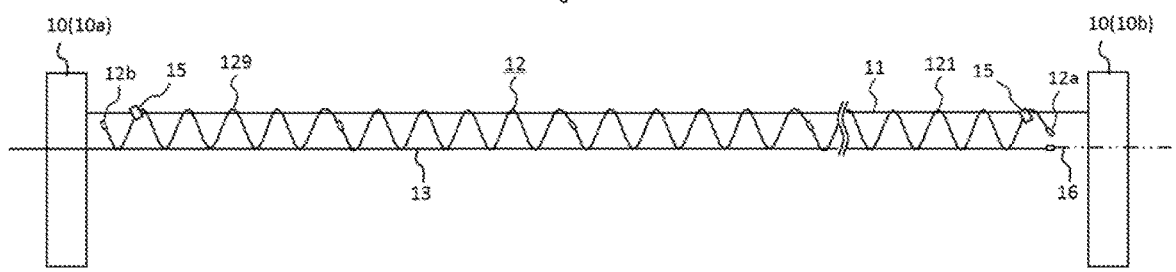
FIG. 9 is a schematic diagram illustrating a step (a1) of the cable installation method according to the present embodiment.
Figure 10:
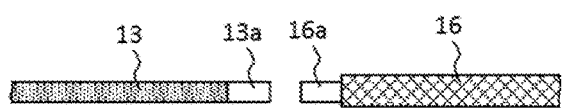
FIG. 10 is a diagram illustrating a cable and a lead wire before connection.

FIG. 1 is a schematic diagram illustrating the cable installation method according to the present embodiment. FIG. 2, FIGS. 5 to 8, FIG. 11, and FIG. 12 are schematic diagrams illustrating respective steps of the cable installation method according to the present embodiment. FIG. 3 and FIG. 4 are diagrams each illustrating a connection state of a coupling unit. FIG. 9 and FIG. 10 are diagrams each illustrating a connection state of the cable and a lead wire.

[Cable Installation Method]

Referring to FIG. 1, in the cable installation method according to the present embodiment, an operator 1 suspends a spiral hangar from a messenger wire 11 that is installed between poles 10 (10a and 10b), the spiral hangar including a plurality of spiral hangar units 121 and the like, and inserts a cable (not illustrated) into an internal space of the spiral hangar 12. At the leading end and the tail end of a spiral hangar unit 121, a leading end connector 12a and a tail end connector 12b are provided, respectively, and by fitting and connecting a leading end connector 12a of one spiral hangar unit and a tail end connector 12b of the other spiral hangar unit to each other, the spiral hangar 12 having a predetermined length is made. At this point, to feed forward the spiral hangar unit, a lead wire 13 is used. The internal space of the spiral hangar 12 is a space formed in a cylindrical shape inside the spiral hangar, in which various kinds of cables are inserted and accommodated.

As the messenger wire 11, for example, a galvanized steel wire strand having an outer diameter of 5.4 mm (18 mm$^2$) to 9.6 mm (55 mm$^2$) can be used.

The spiral hangar 12, for example, can be a spiral hangar that has an inner diameter of 35 mm to 100 mm and include a 3.2 mm galvanized steel wire (a wire galvanized in conformity to JIS G 3537 on a wire of SWRH77A (in conformity to JIS G 3506)), and is formed in a spiral shape, and a high-density PE that has a weatherability and with which the galvanized steel wire is covered. The spiral hangar preferably includes, at both ends, connectors that allow easy connection and has an excellent weatherability.

The lead wire 13 is, for example, an FRP rod or a CFRP rod covered with a resin having a good lubricity, such as PP, AAS, and PA. The FRP rod or the CFRP rod has an outer diameter of, for example, 5 to 11 mm. The lead wire 13 has an outer diameter of, for example, 6.0 to 14 mm.

Referring to FIGS. 1 to 4, in a step (1) of the cable installation method according to the present embodiment, one of a plurality of spiral hangar units 121, 122, . . . is suspended from the messenger wire 11 as a first spiral hangar unit 121 located at a leading endmost position, in the vicinity of first pole 10a. At this point, to the leading end connector 12a of the first spiral hangar unit 121, a connector 13a of the lead wire 13 is connected with a coupling unit 14 interposed therebetween, and the lead wire 13 is inserted in the internal space of the first spiral hangar unit 121. The vicinity of the first pole 10a refers to a region within which the operator 1 operating near the first pole 10a can actually work.

Referring to FIGS. 1 to 3, and FIG. 5, in a step (2) of the cable installation method according to the present embodiment, to the tail end connector 12b of the first spiral hangar unit 121, the leading end connector 12a of another spiral hangar unit 122 is connected. At this point, in the first spiral hangar unit 121 and the spiral hangar unit 122, the lead wire 13 is inserted. In this state, the lead wire 13 is fed toward the second pole 10b. By this step, the relative positions of the first spiral hangar unit 121 and the second spiral hangar unit 122 can be moved toward the second pole 10b.

Referring to FIGS. 1 to 3, and FIG. 6, in a step (3) of the cable installation method according to the present embodiment, to the tail end connector of the second spiral hangar unit 122, the leading end connector 12a of other spiral hangar unit 123 is connected, and the lead wire 13 is fed toward the second pole 10b. This operation is repeated until the leading end connector 12a of the first spiral hangar unit 121 reaches the vicinity of the second pole 10b. The vicinity of the second pole 10b refers to a region within which the operator 1 operating near the second pole 10b can perform its operation.

Referring to FIGS. 1 to 3, and FIG. 7, in a step (4) of the cable installation method according to the present embodiment, the coupling unit 14 is detached from the leading end connector 12a of the first spiral hangar unit 121 and tire connector 13a of the lead wire 13. The detachment of the coupling unit 14 from the leading end connector 12a of the first spiral hangar unit 121 and the connector 13a of the lead wire 13 may be performed after a step (5) described below.

Referring to FIG. 1 and FIG. 7, in a step (5) of the cable installation method according to the present embodiment, a leading end portion of the first spiral hangar unit 121 is fixed to the messenger wire 11 with a clamp 15, and of the plurality of spiral hangar units, the tail end portion a spiral hangar unit 129 at a tail endmost position is fixed to tire messenger wire 11 with a clamp 15. At this point, no special constraint is imposed on the positions of fixing the spiral hangar units, but the positions preferably lie within a region that allows the operator 1 operating in the vicinities of the poles 10a and 10b to operate, actually, at the leading end portion of the first spiral hangar unit 129 (roughly within 500 mm from a terminal end) and at the tail end portion of the spiral hangar unit 129 at the tail endmost position (roughly within 500 mm from a terminal end). In addition to the leading end portion of the first spiral hangar unit 121 and the tail end portion of the spiral hangar unit 129 at the tail endmost position, a spiral hangar unit may be fixed to the messenger wire 11 with a clamp 15 in the vicinity of a midpoint between the poles 10a and 10b.

The clamps 15 may be those commercially available. For example, clamps 15 can be clamps each including two metal plates for sandwiching the messenger wire 11 and the spiral hangar 12, and in this state, the metal plates are fastened with bolts and nuts. In particular, a holding force of the clamps 15 is supposed to be 196 N or higher when the messenger wire 11 and the spiral hangar 12 are attached.

In the cable installation method according to the present embodiment, the above steps (1) to (5) are performed before a cable 16 is installed in the spiral hangar 12. Methods for installing the cable include the following method.

Referring to FIG. 1, and FIGS. 8 to 11, in a step (a1) of the cable installation method according to the present embodiment, the leading end connector 13a of the lead wire 13 is connected to a connector 16a of a leading end of the cable 16, so as to be attached. The cable 16 is an optical cable, metal communication cable, a coaxial cable, a distribution cable, or the like. The outer diameter of the cable 16 is requested to be sufficiently smaller than (the inner diameter of the internal space of the spiral hanger—the outer diameter of the messenger wire). To install a plurality of cables, the percentage of the total cross-sectional area of the cables to the area of a cross section of the internal space of the spiral hanger perpendicular to the axis of the internal space (cable occupancy) is preferably less than 60%. A tensile force applied to the cable is assumed to be not more than the allowable tension of the cable.

Figure 11:
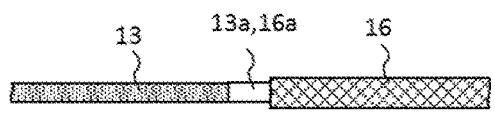
FIG. 11 is a diagram illustrating a cable and a lead wire after the connection.
Figure 12:
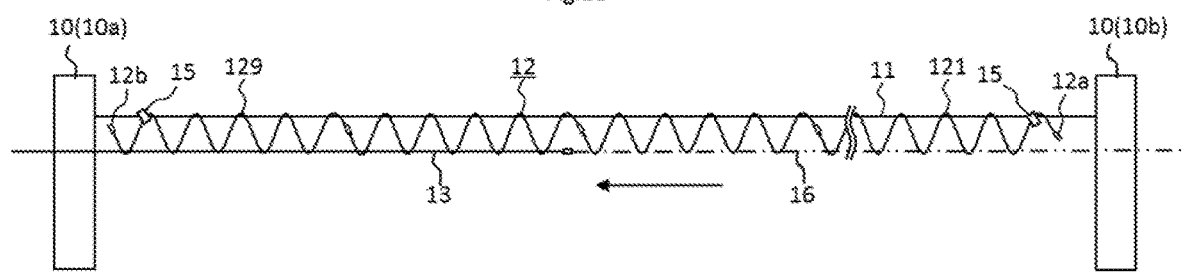
FIG. 12 is a schematic diagram illustrating a step (a2) of the cable installation method according to the present embodiment.
Figure 13:
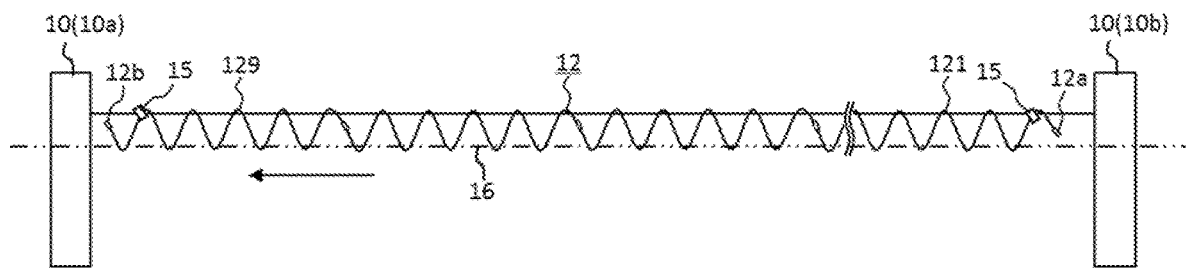
FIG. 13 is a schematic diagram illustrating a step (a3) of the cable installation method according to the present embodiment.

How to connect the leading end connector 13a of the lead wire 13 and the connector 16a at the leading end of the cable 16 is not limited to the example illustrated in FIG. 10 and FIG. 11. For example, the leading end connector 13a of the lead wire 13 and the connector 16a at the leading end of the cable 16 may be formed as an external thread and an internal thread, respectively. Alternatively, a hook-shaped adapter may be attached to the leading end connector 13a of the lead wire 13, the connector 16a at the leading end of the cable 16 may be made up of a ring-shaped jig (or a ring-shaped adapter is attached to the leading end connector 16a), and the hook may be hooked on the ring.

Referring to FIG. 1, and FIG. 10 to FIG. 12, in a step (a2) of the cable installation method according to the present embodiment, the lead wire 13 is drawn toward the first pole 10a, and the drawing of the lead wire 13 is performed until the leading end connector 13a reaches the vicinity of the first pole 10a. The feeding and the drawing of the lead wire 13 are performed using a reel 13b.

Referring to FIG. 1, FIG. 10, FIG. 11, and FIG. 13, in a step (a3) of tire cable installation method according to the present embodiment, the leading end connector 13a of the lead wire 13 is detached from the connector 16a at the leading end of the cable 16. In such a manner, the cable 16 is installed between the poles 10a and 10b. In the above, description has been made to the method for installing one cable 16, but no limitation is imposed on the number and the size of cables 16. Any number of the cables 16 of any size can Ire installed as long as the number and the size allow the cables to be accommodated in the internal space of the spiral hangar 12.

As described above, the cable 16 can be drawn with the connector 16 at the leading end of the cable connected to the leading end connector 13a of the lead wire 13 in a case in which the distance between the poles 10a and 10b is short, or a case in which the cable 16 is relatively light cable such as an optical drop cable, but the cable 16 cannot be drawn using human power in a case in which the distance between the poles 10a and 10b is long, or a case in which the cable 16 has a heavy weight. In such cases, a tow rope may be pulled using a motor reel. A cable installation method according to the other embodiment will be described below. Also in this method, the above steps (1) to (5) are performed as in the above example.

Figure 14:
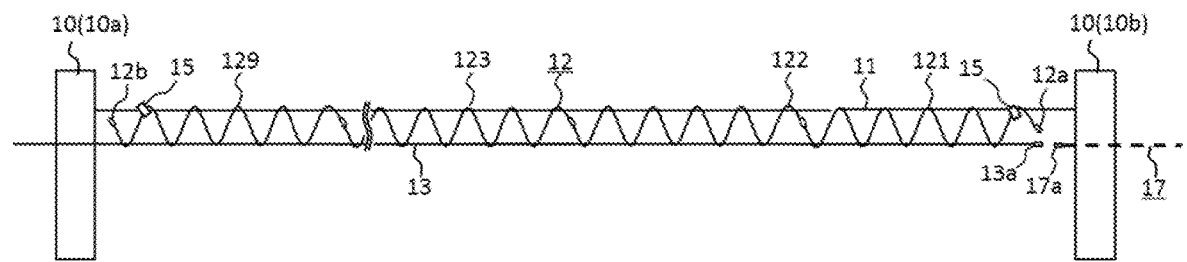
FIG. 14 is a schematic diagram illustrating a step (b1) of the cable installation method according to the present embodiment.
Figure 15:
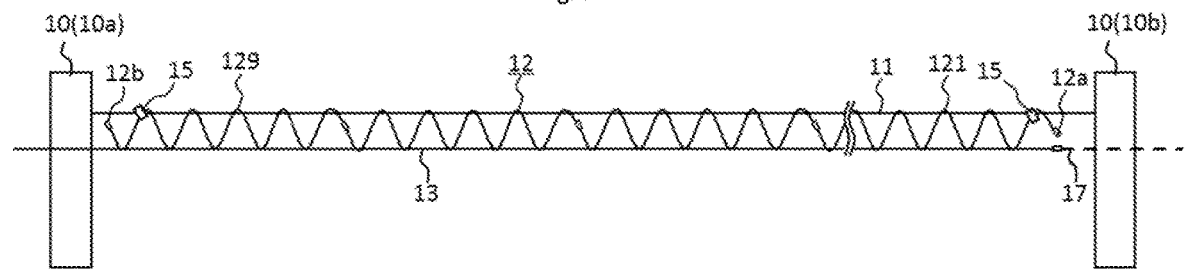
FIG. 15 is a schematic diagram illustrating a step (b1) of the cable installation method according to the present embodiment.

Referring to FIG. 1, FIG. 14, and FIG. 15, in a step (b1) of the cable installation method according to the present embodiment the leading end connector 13a of the lead wire 13 connected to a connector 17a at a leading end of a tow rope 17, so as to be attached thereto. As the tow rope 17, for example, a resin liber rope made of polyester, nylon, or the like is used.

No special constraint is imposed on how to connect the leading end connector 13a of the lead wire 13 and the connector 17a at the leading end of the tow rope 17. For example, a hook-shaped adapter may be attached to the leading end connector 13a of the lead wire 13, the connector 17a at the leading end of the tow rope 17 may be made up of a ring-shaped jig, and the hook may be hooked on the ring.

Figure 16:
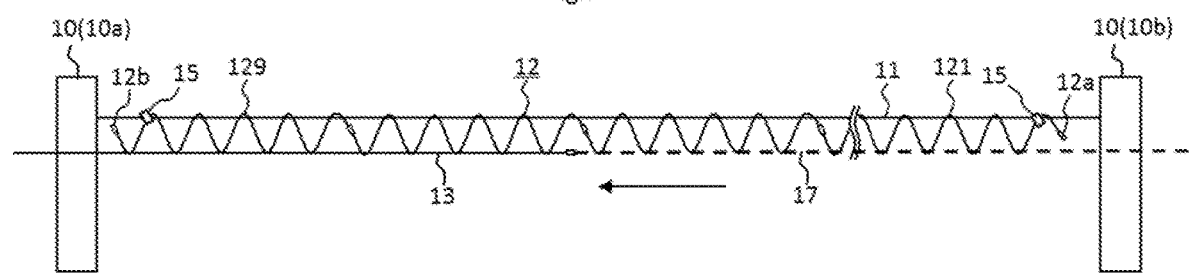
FIG. 16 is a schematic diagram illustrating a step (b2) of the cable installation method according to the present embodiment.

Referring to FIG. 1, FIG. 15, and FIG. 16, in a step (b2) of the cable installation method according to the present embodiment, the lead wire 13 is drawn toward the first pole 10a, and the drawing of the lead wire 13 is performed until the leading end connector 13a reaches the vicinity of the first pole 10a. The feeding and the drawing of the lead wire 13 are performed using a reel 13b.

Figure 17:
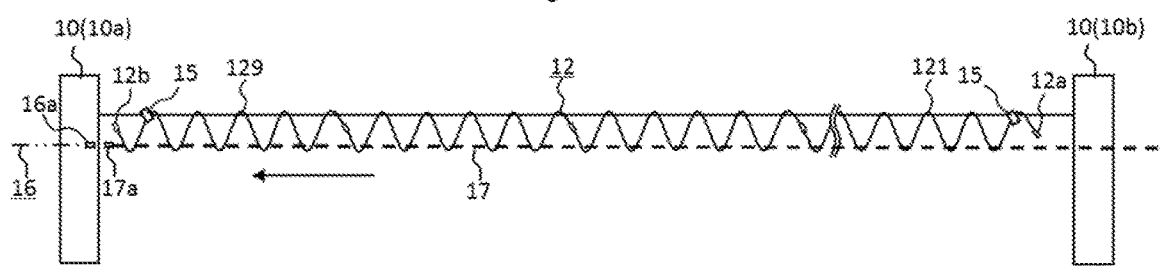
FIG. 17 is a schematic diagram illustrating a step (b3) of the cable installation method according to the present embodiment.

Referring to FIG. 1 and FIG. 17, in a step (b3) of the cable installation method according to the present embodiment, the leading end connector 13a of the lead wire 13 is detached from the connector 17a at the leading end of the tow rope 17.

Figure 18:
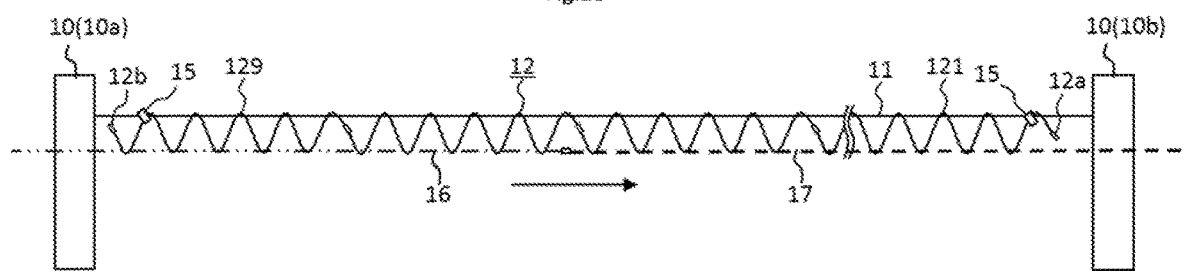
FIG. 18 is a schematic diagram illustrating a step (b4) of the cable installation method according to the present embodiment.

Referring to FIG. 1, FIG. 17, and FIG. 18, in a step (b4) of the cable installation method according to the present embodiment, the connector 17a at the leading end of the tow rope 17 is connected to the connector 16a at the leading end of the cable 16, so as to be attached thereto. No special constraint is imposed on how to connect the leading end connector 17a of the tow rope 17 and the connector 16a at the leading end of the cable 16. For example, a hook-shaped adapter may be attached to the connector 16a at the leading end of the cable 16, the connector 17a at the leading end of the tow rope 17 may be made up of a ring-shaped jig, and the hook may be hooked on the ring.

Figure 19:
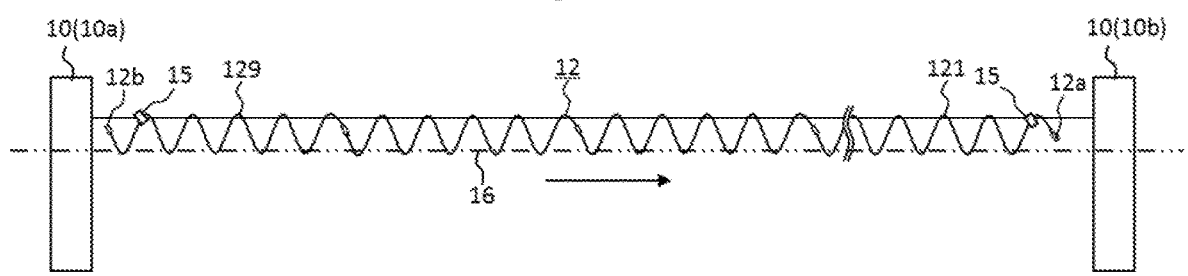
FIG. 19 is a schematic diagram illustrating a step (b5) of the cable installation method according to the present embodiment.

Referring to FIG. 1, FIG. 18, and FIG. 19, in a step (b5) of the cable installation method according to the present embodiment, the tow rope 17 is drawn toward the second pole 10b, and the drawing of the tow rope 17 is performed until the leading end connector 17a reaches the vicinity of the first pole 10a. The feeding and the drawing of the lead wire 13 are performed using a reel 13b.

In such a manner, the cable 16 is installed between the poles 10a and 10b. In the above, description has been made to the method for installing one cable 16, but no limitation is imposed on the number and the size of cables 16. Any number of the cables 16 of any size can be installed as long as the number and the size allow the cables to be accommodated in the internal space of the spiral hangar 12. In the above example, the description has been made about, by way of example, the case in which the cable is installed between the two poles 10a and 10b, but the present invention is not limited to such an example. That is, the present invention is applicable also to a case in which a cable is installed between three or more poles, and in this case, the drawing of the lead wire 13 and the drawing of the tow rope 17 can be performed not only between two poles but also between three or more poles.

[Coupling Unit]

As illustrated in FIG. 3 and FIG. 4, the coupling unit 14 used in the cable installation method according to the present embodiment includes a rod-shaped body including a first connector 14a at one end thereof and a second connector 14b at the other end thereof, the first connector 14a being to be connected to the leading end connector 12a of the spiral hangar unit 121, the second connector 14b being to be connected to the connector 13a of the lead wire 13. By connecting the leading end connector 12a of the first spiral hangar unit 121 to the first connector 14a and connecting the connector 13a of the connector 13 to the second connector 14b, the first spiral hangar unit 121 and the lead wire 13 can be connected firmly.

Here, it is preferable to provide detachable configurations between the leading end connector 12a of the first spiral hangar unit 121 and the coupling lead wire 14, and between the leading end connector 13a of the lead wire 13. This allows the reuse of the coupling unit 14. In addition, the shape of the second connector 14b is preferably formed into the same shape as that of the connector 16a at the leading end of the cable 16. This makes it easy to attach and detach between the lead wire 13 and the coupling unit 14 or the cable 16.

The rod-shaped body of the coupling unit 14 includes a first straight section 14c extending in the helix angle of the spiral hangar unit 121, a second straight section 14d extending in the direction of movement of the spiral hangar unit 121 (the axis direction of the cylindrical internal space), and a bending portion 14e connected to the first straight section 14c and the second straight section 14d. This makes it easy to attach and detach between the spiral hangar unit 121 and the lead wire 13.

The material of the rod-shaped body of the coupling unit 14 preferably has a tensile strength of not less than 200 N, and a steel wire, a steel rod, or the like, for example, can be used. A string-shaped material or a chain may also be used as long as it has a tensile strength of not less than 200 N.

INDUSTRIAL APPLICABILITY

The present invention makes it easy to attach and detach the spiral hangar to and from a lead wire and to feed the lead wire, and enables the installation of a cable with an improved workability. The present invention is useful particularly for the installation of a cable between poles at a distance.

REFERENCE SIGNS LIST 1 operator
10 (10a, 10b) pole
11 messenger wire
12 spiral hangar
   121 to 129 spiral hangar unit
   12a leading end connector
   12b tail end connector
13 lead wire
   13a connector
   13b reel
14 coupling unit
   14a first connector
   14b second connector
   14c first straight section
   14d second straight section
   14e bending portion
15 clamp
16 cable
   16a connector
17 tow rope
   17a connector

What is claimed is:

1. A cable installation method comprising steps of:
providing a lead wire included a connector at a leading end of the lead wire configured to suspend a spiral hanger from a messenger wire installed between poles, the spiral hanger made up of a plurality of spiral hangar units connected to each other, each of the spiral hangar units including a leading end connector and a tail end connector, and the cable is inserted in an internal space of the spiral hangar;
suspending a first spiral hangar unit, which is located at a leading endmost position of the plurality of spiral hangar units, from the messenger wire in a vicinity of a first pole, in a state in which the lead wire is inserted in the internal space of the first spiral hangar unit and a leading end connector of the first spiral hangar unit is connected to a connector of the lead wire with a coupling unit interposed therebetween;
feeding the leading wire toward a second pole, in a state in which a tail end connector of the first spiral hangar unit is connected to a leading end connector of second spiral hangar unit in which the lead wire is inserted;
repeatedly connecting a tail end connector of the second spiral hangar unit to a leading end connector of other spiral hangar unit in which the lead wire is inserted and feeding the lead wire toward the second pole, until the leading end connector of the first spiral hangar unit reaches a vicinity of the second pole;
detaching the coupling unit from the leading end connector of the first spiral hangar unit and the connector of the lead wire; and
fixing a leading end portion of the first spiral hangar unit to the messenger wire, and fixing a tail end portion of a spiral hangar unit, which is located at a tail endmost position of the plurality of spiral hangar units, to the messenger wire.

2. The cable installation method according to claim 1, wherein the coupling unit includes a rod-shaped body including:
a first connector at one end of the rod-shaped body and a second connector at another end of the rod-shaped body,
further comprising connecting the first connector to the leading end connector of the spiral hangar unit, and connecting the second connector to the connector of the lead wire.

3. The cable installation method according to claim 2, further comprising connecting a connector at the leading end of the cable to the connector of the lead wire.

4. The cable installation method according to claim 2, further comprising following steps of:
attaching the leading end connector of the lead wire to a leading end connector of a tow rope;
drawing the lead wire until the leading end connector of the lead wire reaches the vicinity of the first pole; and
attaching the leading end connector of the tow rope to a leading end of the cable;
drawing the tow rope until the leading end connector of the tow rope reaches the vicinity of the second pole; and
detaching the leading end connector of the tow rope from the leading end of the cable.

5. The cable installation method according to claim 2, further comprising following steps of:
attaching the leading end connector of the lead wire to a leading end of the cable;
drawing the lead wire until the leading end connector of the lead wire reaches the vicinity of the first pole; and
detaching the leading end connector of the lead wire from the leading end of the cable.

6. The cable installation method according to claim 5, further comprising connecting a connector at the leading end of the cable to the connector of the lead wire.

7. The cable installation method according to claim 1, further comprising following steps of:
attaching the leading end connector of the lead wire to a leading end of the cable;
drawing the lead wire until the leading end connector of the lead wire reaches the vicinity of the first pole; and
detaching the leading end connector of the lead wire from the leading end of the cable.

8. The cable installation method according to claim 7, further comprising connecting a connector at the leading end of the cable to the connector of the lead wire.

9. The cable installation method according to claim 1, further comprising following steps of:
attaching the leading end connector of the lead wire to a leading end connector of a tow rope;
drawing the lead wire until the leading end connector of the lead wire reaches the vicinity of the first pole; and
attaching the leading end connector of the tow rope to a leading end of the cable;
drawing the tow rope until the leading end connector of the tow rope reaches the vicinity of the second pole; and
detaching the leading end connector of the tow rope from the leading end of the cable.

10. The cable installation method according to claim 1, further comprising connecting a connector at the leading end of the cable to the connector of the lead wire.

11. A coupling unit used in the cable installation method comprising:
providing a lead wire included a connector at a leading end of the lead wire configured to suspend a spiral hanger from a messenger wire installed between poles, the spiral hanger made up of a plurality of spiral hangar units connected to each other, each of the spiral hangar units including a leading end connector and a tail end connector, and the cable is inserted in an internal space of the spiral hangar;
suspending a first spiral hangar unit, which is located at a leading endmost position of the plurality of spiral hangar units, from the messenger wire in a vicinity of a first pole, in a state in which the lead wire is inserted in the internal space of the first spiral hangar unit and a leading end connector of the first spiral hangar unit is connected to a connector of the lead wire with a coupling unit interposed therebetween;
feeding the leading wire toward a second pole, in a state in which a tail end connector of the first spiral hangar unit is connected to a leading end connector of second spiral hangar unit in which the lead wire is inserted;
repeatedly connecting a tail end connector of the second spiral hangar unit to a leading end connector of other spiral hangar unit in which the lead wire is inserted and feeding the lead wire toward the second pole, until the leading end connector of the first spiral hangar unit reaches a vicinity of the second pole;
detaching the coupling unit from the leading end connector of the first spiral hangar unit and the connector of the lead wire; and
fixing a leading end portion of the first spiral hangar unit to the messenger wire, and fixing a tail end portion of a spiral hangar unit, which is located at a tail endmost position of the plurality of spiral hangar units, to the messenger wire, wherein the coupling unit includes a rod-shaped body including:

a first connector at one end of the rod-shaped body and a second connector at another end of the rod-shaped body, the first connector being to be connected to the leading end connector of the spiral hangar unit, the second connector being to be connected to the connector of the lead wire.

12. The coupling unit according to claim 11, wherein the rod-shaped body includes a first straight section extending in a helix angle of the spiral hangar unit, a second straight section extending in a direction of movement of the spiral hangar unit, and a bending portion connected to the first straight section and the second straight section.

* * * * *